A. B. FULLERTON.
HOG WATERER.
APPLICATION FILED JUNE 24, 1919.

1,359,885.

Patented Nov. 23, 1920.
3 SHEETS—SHEET 1.

Inventor
A. B. Fullerton

By

Attorneys

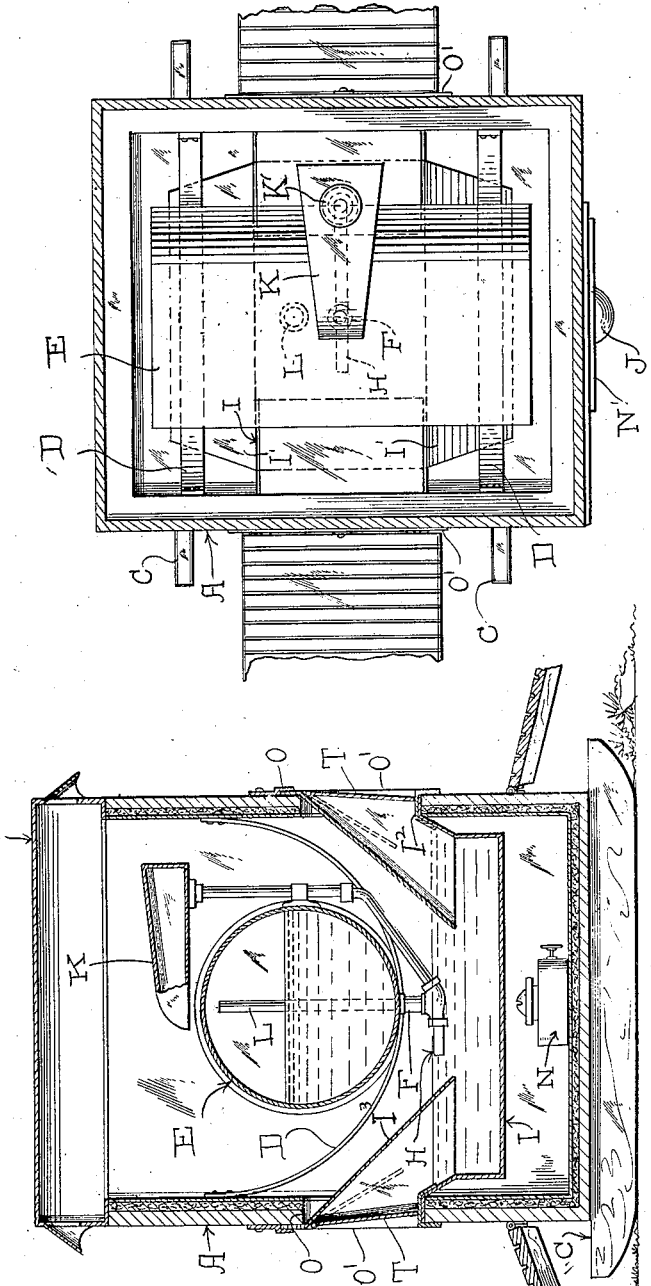

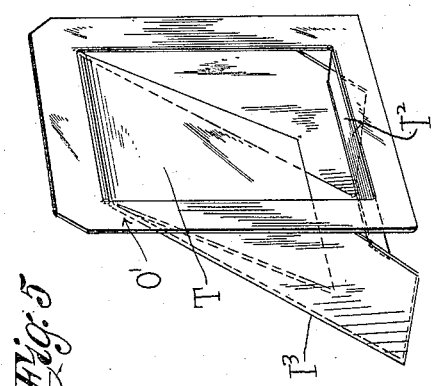
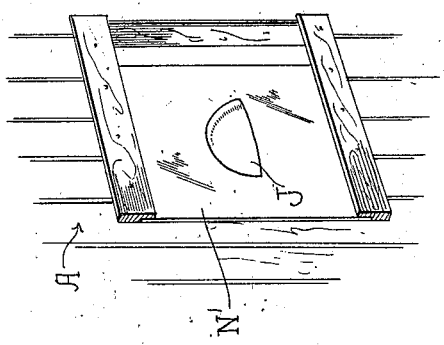
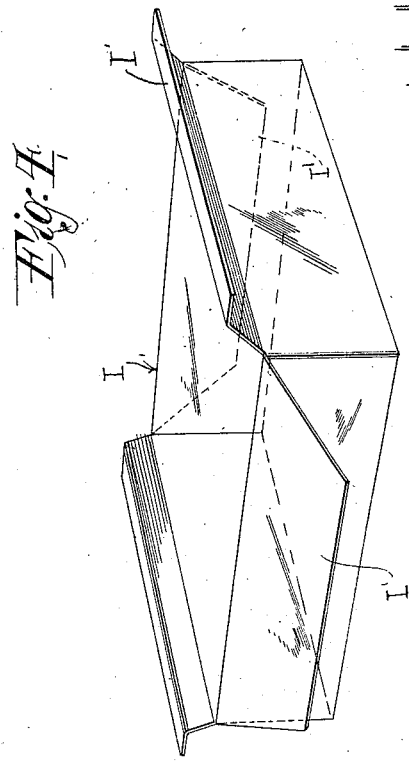

UNITED STATES PATENT OFFICE.

ASA B. FULLERTON, OF WASHINGTON, IOWA.

HOG-WATERER.

1,359,885. Specification of Letters Patent. Patented Nov. 23, 1920.

Application filed June 24, 1919. Serial No. 306,301.

*To all whom it may concern:*

Be it known that I, ASA B. FULLERTON, a citizen of the United States, residing at Washington, in the county of Washington and State of Iowa, have invented certain new and useful Improvements in Hog-Waterers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hog watering apparatus and consists of a simple and efficient apparatus of this nature.

The present invention comprises a hog waterer so arranged that the same may be conveniently transported from place to place, and provided with means for giving ready access to the tank for the purpose of filling the same.

The invention consists further in an apparatus so arranged that the water within the drinking trough may be heated in cold weather economically by a novel means of distributing the heat, and in the provision of various other details which will be hereinafter fully described, shown in the accompanying drawings and then specifically defined in the appended claim.

My invention is illustrated in the accompanying drawings which, with the letters of reference marked thereon, form a part of this application, and in which:

Fig. 2 is a central sectional view through the same.

Fig. 3 is a plan view with the top removed.

Figs. 4 and 5 are detail views, and Fig. 6 is a detail perspective view of the slide for closing the opening in the apparatus.

Figure 1:
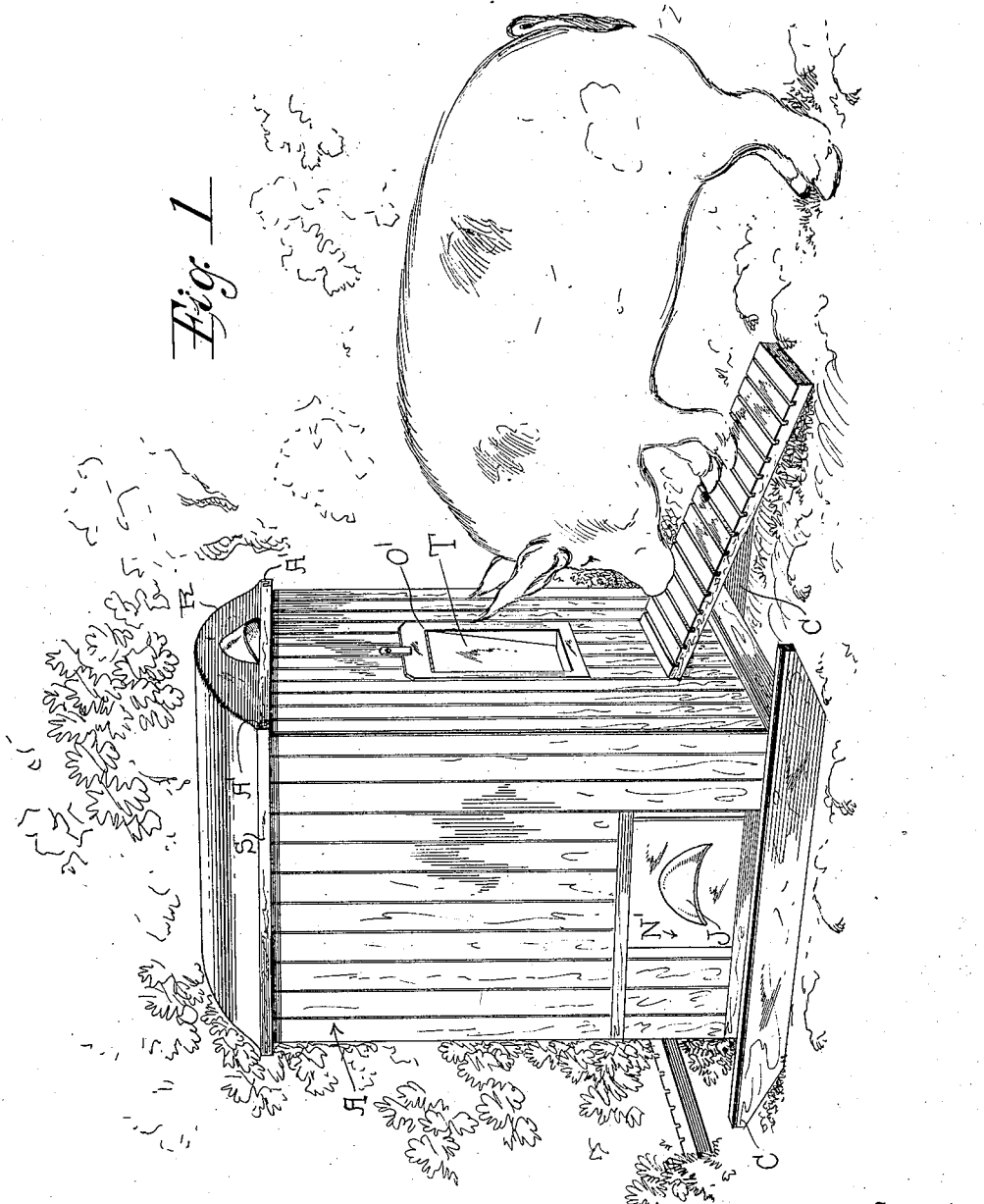
Figure 1 is a perspective view of the complete hog waterer.

Reference now being had to the details of the drawings by letter:

A designates the housing of the waterer which may be of any suitable material, preferably of wood, and provided with a galvanized iron lining.

For convenience in moving from place to place, the same is mounted upon skids C. Within the housing are two concaved supporting bands D spaced apart which form supports for a cylindrical tank E, which has a filling pipe F leading through an opening in the bottom thereof and connected with said pipe is an exit tube H through which water is adapted to flow from the tank into the trough I. The pipe F communicates with a receptacle K, access to the latter for filling being had through the opening closed by the lid K'. A vent tube L which appears in Fig. 2 to extend into the tube F, but which, in fact, as shown in Fig. 3, is in the rear of the vent tube F and spaced apart therefrom, and extends down into the trough, passes centrally up through the tank and has its upper end open adjacent to the top of the latter.

The drinking trough I is provided with oppositely disposed wings I' which extend laterally and are adapted to deflect heat from the lamp N which is mounted underneath the trough. The housing is provided with an opening to receive the lamp, which opening is closed by a sliding door N' having a handle J.

The opposite walls of the housing are provided with openings O having frames O' therein, and pivoted to said frames are the swinging doors T which normally close the openings but which, when pushed upon by the hog when it desires to have access to the drinking trough, will swing inward and permit the animal to drink from the trough, and when the head of the animal is withdrawn from the opening, the door will automatically swing to a closed position, which will prevent small animals, fowl, etc., from having access to the trough. The opposite end walls I' of the trough are angular and extend through and rest over the angular wings $O^2$ of the door frame and $I^3$ designate inclined portions of the door frame which extend down to a location opposite the upper portion of the trough and which serve to limit the inner throw of the doors T.

The top is designated by letter R and has upon its opposite edges metallic strips S which are bent to form flanges which interlock with bars A' upon the upper portion of the housing, thus forming a sliding connection between the top and the body portion of the housing.

The top is provided with a suitable ventilating means as is also the bottom portion, permitting air for combustion purposes to enter the chamber underneath the trough where the lamp is located.

Bridges Q are hinged at Q' to the housing which when not in use, will fold up over the openings O out of the way and serve as protection to the doors when the device is in storage or when moved from place to place.

In operation, the tank is filled by water being poured into the receptacle, the exit end of the pipe H being temporarily closed until the tank is filled, after which the cork is removed, the pipe L serving as means for venting the tank when being filled.

By the provision of a hog waterer embodying the features of my invention, it will be noted that a simple and efficient apparatus is provided and so arranged that the animals may drink at will by reason of the doors being automatically opened to give access to the trough, and which is kept in a clean condition by reason of the doors automatically closing when the trough is not in use. The apparatus is so constructed that it may be heated in cold weather to keep the water within from freezing.

What I claim to be new is:

A hog waterer comprising a rectangular housing perforated on opposed sides, a trough extending substantially from one perforation to the other within the housing and below the perforations, a detachable channel adapted to fit the perforation and to extend downward to within the trough and provided with a depending door adapted to be substantially coplanar with the exterior of the housing, a recess within said housing below said trough for a heating element, a chamber within said housing above said trough, a bowed member affixed to the side walls of said chamber and depending in its middle to nearly the top of said trough, a cylindrical reservoir adapted to lie upon its side in the middle of said bowed member, a pipe extending through the wall of said reservoir to nearly the opposed side thereof and outward sufficiently to be submerged in water when said pipe is downward and vertical and when said trough is filled with water and said cylinder is resting on said bowed member, an exterior conduit mounted upon said cylinder and opening at substantially a level with the exterior opening of said pipe and leading from an auxiliary supply, a duplicate channel fitting the other said perforation, a pair of closures for the said depending doors pivoted below said perforations and adapted to form closures when swung upward and to form track ways for animals when swung downward.

In testimony whereof I hereunto affix my signature.

ASA B. FULLERTON.